2,942,934
METHOD FOR EXTRACTING SODIUM BOROHYDRIDE

Robert C. Wade, Ipswich, James J. McSharry, Salem, and Mario D. Banus, Topsfield, Mass., assignors to Metal Hydrides Incorporated, Beverly, Mass., a corporation of Massachusetts No Drawing. Filed July 28, 1955, Ser. No. 525,082

3 Claims. (Cl. 23—14)

The United States patent to H. L. Schlesinger and Herbert C. Brown No. 2,534,533 describes the preparation of sodium borohydride by heating sodium hydride with an alkyl borate, such as methyl borate, at a temperature between 200° and 275° C. The reaction is illustrated by equation:

$$4NaH + B(OCH_3)_3 \rightarrow NaBH_4 + 3NaOCH_3$$

When the reaction is complete the product is cooled and agitated with a solvent to extract the borohydride from the sodium alkoxide. Suitable solvents are liquid ammonia and isopropylamine. The solution of the borohydride is separated from the sodium alkoxide by filtration and the solvent then is removed from the sodium borohydride solution by evaporation.

The copending application of Mario D. Banus and Robert W. Bragdon, Serial No. 427,872, filed May 5, 1954, now Patent No. 2,720,444, describes the preparation of sodium borohydride by heating a finely divided dispersion of sodium hydride in an inert liquid hydrocarbon such as a heavy white mineral oil, in the presence of an alkyl borate, such as methyl borate, while the dispersion is vigorously stirred. The resulting product is essentially a reaction mixture in oil of sodium borohydride and sodium alkoxide containing the excess sodium hydride. The principal advantages of this method are an increased reaction rate and higher yield. However, the separation of the sodium borohydride from the sodium alkoxide and liquid hydrocarbon presents considerable difficulty since most of the solvents for sodium borohydride are miscible with the liquid hydrocarbon. Liquid ammonia is not miscible with the liquid hydrocarbon and is a low cost solvent.

When one volume of the above mentioned reaction mixture in an inert liquid hydrocarbon, such as a heavy white mineral oil, is agitated for thirty minutes with three volumes of liquid ammonia in a pressurized extraction vessel at room temperature, the pressure in the system increases from the normal liquid ammonia vapor pressure of about 110 p.s.i.g. to about 150 p.s.i.g. while the temperature remains constant. This increase in pressure is due to the generation of hydrogen by the reaction of sodium hydride with trace amounts of moisture in the liquid ammonia and in the extraction system. When the system is allowed to settle two layers separate, namely, a top clear layer, which is a solution of sodium borohydride in liquid ammonia, and a bottom layer in which as much as 40 percent of the liquid ammonia and 40 percent of the sodium borohydride content of the reaction mixture are emulsified with the oil and solid byproduct. The top clear layer may be separated by decantation. Thus, only 60 percent of the sodium borohydride is recovered in a single extraction. By treating the emulsified layer in the same manner and with the addition of an amount of liquid ammonia equal to the amount of solution removed in the previous step, an additional 24 percent of the sodium borohydride can be recovered in a top clear layer of liquid ammonia solution floating upon a bottom emulsified layer. By two additional similar extractions, the total recovery of sodium borohydride is about 97 percent of that present in the original reaction mixture. If the reaction mixture in the liquid hydrocarbon is subjected to a similar series of extractions in which the amount of liquid ammonia used in each extraction is less, the number of extracting operations is considerably increased. The above results are illustrated in detail in the following Tables 1 and 2. Table 1 illustrates the number of extracting operations required when two volumes of liquid ammonia to one volume of the reaction mixture in the liquid hydrocarbon are used, the volume of additional liquid ammonia added to the emulsified layer treated in each of the extractions 2 to 7 being equal to the volume of clear solution removed in the previous extraction. Table 2 illustrates the number of extracting operations required when three volumes of liquid ammonia to one volume of the reaction mixture are used, the volume of additional liquid ammonia added to the emulsified layer treated in each of the extractions 2 to 4 being equal to the amount of solution removed in the previous extraction.

TABLE 1

| Number of extractions | Percent NaBH₄ extracted in each extracting operation | Total amount of NaBH₄ extracted in percent |
|---|---|---|
| 1 | 40 | 40 |
| 2 | 24 | 64 |
| 3 | 14.4 | 78.4 |
| 4 | 8.6 | 87.0 |
| 5 | 5.2 | 92.2 |
| 6 | 3.1 | 95.3 |
| 7 | 1.9 | 97.2 |

TABLE 2

| Number of extractions | Percent NaBH₄ extracted in each extracting operation | Total amount of NaBH₄ extracted in percent |
|---|---|---|
| 1 | 60 | 60 |
| 2 | 24 | 84 |
| 3 | 9.6 | 93.6 |
| 4 | 3.8 | 97.4 |

The present invention makes it possible to extract sodium borohydride with liquid ammonia from a reaction mixture in a liquid hydrocarbon, such as a heavy mineral oil, and obtain a high recovery of sodium borohydride in a single extracting operation and reduce greatly the number of extracting operations required to obtain substantially complete recovery of the sodium borohydride from the reaction mixture. The invention is based upon the discovery that if the reaction mixture in the liquid hydrocarbon is treated with a sufficient amount of water to decompose its sodium hydride content, the thus treated material can be agitated with liquid ammonia and settled to obtain a bottom emulsified layer containing as little as 17 to 25 percent of the sodium borohydride content of the reaction mixture and a top layer of liquid ammonia solution containing about 75 or 83 percent of the sodium borohydride content of the reaction mixture when two volumes or three volumes of liquid ammonia respectively are agitated with one volume of the reaction mixture in the liquid hydrocarbon. By treating these emulsified layers in the same manner with amounts of liquid ammonia equal to the volume of the solution removed in the previous extraction, correspondingly high recoveries of the sodium borohydride contents therefrom are obtained. Consequently, a satisfactory recovery of the sodium borohydride content of the reaction mixture can be obtained with two or three extracting operations depending upon whether two or three volumes of liquid ammonia are used to one volume of the reaction mixture in the liquid hydrocarbon. This is illustrated by the following tables. Table 3 shows the number of extracting operations required, and the recoveries of sodium borohydride obtained when two volumes of liquid ammonia are used to one volume of the reaction mixture in the liquid hydrocarbon when treated in accordance with the invention, the volume of liquid ammonia added to the emulsified layer treated in each of extractions 2 and 3 being equal to the volume of solution removed in the previous extraction. Table 4 illustrates the number of extracting operations required and the recoveries of sodium borohydride obtained when three volumes of liquid ammonia are used to one volume of the reaction mixture in the liquid hydrocarbon when treated in accordance with the invention, the volume of liquid ammonia added to the emulsified layer treated in extraction 2 being equal to the solution removed in the first extraction.

TABLE 3

| Number of extractions | Percent NaBH₄ extracted in each extracting operation | Total amount of NaBH₄ extracted in percent |
| --- | --- | --- |
| 1 | 75 | 75 |
| 2 | 18.7 | 93.7 |
| 3 | 4.7 | 98.4 |

TABLE 4

| Number of extractions | Percent NaBH₄ extracted in each extracting operation | Total amount of NaBH₄ extracted in percent |
| --- | --- | --- |
| 1 | 83 | 83 |
| 2 | 14.1 | 97.1 |

Comparison of Table 3 with Table 1 and Table 4 with Table 2 shows that when the reaction mixture in the liquid hydrocarbon is treated in accordance with the present invention substantially all its sodium borohydride content can be recovered by one-half the number of extracting operations required when the reaction mixture is not treated in accordance with the invention.

In the practice of the present invention, the reaction mixture in the liquid hydrocarbon may be treated with water to decompose its sodium hydride content prior to or during treatment with liquid ammonia to extract its sodium borohydride content. For optimum results the amount of water used should be sufficient to decompose all the sodium hydride of the reaction mixture but should not be substantially more than such amount.

In determining the sodium hydride content in the sodium borohydride-sodium alkoxide reaction mixture in the inert liquid hydrocarbon, water is added to the mixture until hydrogen ceases to be evolved. The amount of hydrogen evolved is measured and computed as sodium hydride. It is with this meaning that the term "sodium hydride content" of the reaction mixture in the liquid hydrocarbon is used in this specification and the appended claims. The amount of water used in making this determination is the "water equivalent" of the "sodium hydride content."

The invention is illustrated further by the following examples.

*Example 1 (Prior art)*

A 1000 cc. portion of a reaction mixture in mineral oil containing 6.1% of sodium borohydride, 2.5% of sodium hydride and 20% of sodium methoxide was placed in a pressurized extraction vessel to which 3000 cc. of liquid ammonia was added at room temperature. Vigorous agitation was applied to the system for thirty minutes. Ammonia emulsified with the oil and the pressure in the system increased from 105 p.s.i.g. to 150 p.s.i.g., while the temperature remained constant. After stirring, the system was allowed to settle for twenty minutes. A clear layer of a solution of sodium borohydride in ammonia separated and floated upon a bottom layer of oil-solids which was emulsified with ammonia. The top layer had a volume of about 1800 cc. and the volume of the bottom layer was about 2200 cc. Upon longer standing, the volumes of the layers did not change. Since only 60 percent of the ammonia used could be recovered by decantation, the recovery of sodium borohydride in a single-stage extraction is only 60 percent of the sodium borohydride content of the reaction mixture.

*Example 2*

A batch of reaction mixture in oil containing sodium borohydride and sodium methoxide together with 3.5% of sodium hydride was treated with sufficient water to react with the sodium hydride present. This reaction was carried out in an open vessel overnight with a maximum reaction temperature of 35°–40° C. controlled by the addition rate of water. The sodium hydride content was reduced to 3.2% in 30 minutes, to 1.8% in 60 minutes, to 1.1% in 75 minutes, to 0.5% in 125 minutes and to 0.18% after 16 hours. 1000 cc. of this material was agitated with 3000 cc. of liquid ammonia as described in the previous example. No build-up of pressure in the ammonia system was noted during the 30 minutes of stirring. After settling for 20 minutes, the clear ammonia-sodium borohydride solution had a volume of 2500 cc. The oil-solids layer contained only 500 cc. of emulsified ammonia and had a volume of 1500 cc. Thus, in a single stage extraction 83.5% of the ammonia was recovered which contained a corresponding amount of the original sodium borohydride present.

*Example 3*

Samples of the same reaction mixture in oil used in Example 2 were treated as described in Example 2 with water equivalent to the sodium hydride content but at elevated temperatures to hasten the decomposition of sodium hydride. At 50° C. the reaction was complete in 5 hours and gave extraction results identical to those described in Example 2. When the water-treatment temperature was raised to 80° C. the reaction was complete in 90 minutes and at 100° C. it was complete in 30 minutes.

*Example 4*

In this test 1000 cc. of the same reaction mixture in oil used in Examples 2 and 3 was used. Water was added equivalent to the sodium hydride content plus a 5% excess over this amount at the time the reaction mixture was charged into the extractor. Then 3000 cc. of liquid ammonia was added and stirring started. The reaction of water with the sodium hydride commenced immediately and the pressure increased from 110 p.s.i.g. to 150 p.s.i.g. within a few minutes. The excess pressure was vented periodically over a period of 75 minutes of agitation. At the end of this time the reaction had ceased and the system was allowed to settle to form a clear layer and an oil emulsified layer. The clear ammonia layer had a volume of 2500 cc. which is 83.5% of the total ammonia used.

The oil emulsified layer was treated with 2500 cc. of liquid ammonia and allowed to settle. The two ammonia extracts were combined and concentrated until the ammonia-sodium borohydride solution had a boiling point of minus 3° C. at atmospheric pressure. This solution was filtered and the filtrate was evaporated to dryness. A white product was obtained which contained 94 percent sodium borohydride.

We claim:
1. In the production of sodium borohydride wherein an alkyl borate is reacted with sodium hydride as a dis- persion in an inert liquid hydrocarbon to form a reaction mixture consisting essentially of sodium borohydride and sodium alkoxide together with sodium hydride in the liquid hydrocarbon and wherein the reaction mixture in the liquid hydrocarbon is agitated with an amount of liquid ammonia at least equal to the amount calculated to dissolve the sodium borohydride and then is permitted to settle and form a layer of a solution of sodium borohydride in liquid ammonia floating upon an emulsified layer comprising the liquid hydrocarbon, solids and a liquid ammonia solution of sodium borohydride, separating the layer of a solution of sodium borohydride in liquid ammonia, and removing the liquid from the separated layer by evaporation to obtain solid sodium borohydride, the improvement which comprises adding water to the reaction mixture in the liquid hydrocarbon until hydrogen ceases to be evolved thereby substantially reducing the amount of the liquid ammonia solution of sodium borohydride in said emulsified layer and increasing by a corresponding amount the volume of said floating layer.

2. The method of claim 1 wherein said reaction mixture is agitated simultaneously with water and liquid ammonia.

3. The method of claim 1 wherein said sodium hydride content is decomposed prior to agitation with liquid ammonia.

References Cited in the file of this patent

UNITED STATES PATENTS

| | | |
|---|---|---|
| 2,542,746 | Banus et al. | Feb. 20, 1951 |
| 2,720,444 | Banus et al. | Oct. 11, 1955 |

FOREIGN PATENTS

| | | |
|---|---|---|
| 717,451 | Great Britain | Oct. 27, 1954 |
| 148,554 | Sweden | Jan. 25, 1955 |

OTHER REFERENCES

Franklin et al.: "American Chemical Journal," vol. 20, pp. 826–827 (1898).